United States Patent [19]

Wood

[11] Patent Number: 4,909,969
[45] Date of Patent: Mar. 20, 1990

[54] METHOD AND APPARATUS FOR REMOVING A CONTACT LENS FROM A PLASTIC MOLD

[76] Inventor: Kenneth E. Wood, 1855 Macedon Center Rd., Macedon, N.Y. 14502

[21] Appl. No.: 397,273

[22] Filed: Aug. 23, 1989

[51] Int. Cl.⁴ .............................................. B29D 11/00
[52] U.S. Cl. ...................................... 264/1.1; 264/2.3; 264/313; 264/334; 425/440; 425/808
[58] Field of Search .................. 264/1.1, 2.2, 2.3, 2.7, 264/313, 334; 425/440, 808

[56] References Cited

U.S. PATENT DOCUMENTS 4,042,652  8/1977  Feneberg .............................. 264/2.3
4,155,962  5/1979  Neefe .................................... 264/2.3
4,457,880  7/1984  Neefe .................................... 264/2.3

Primary Examiner—James Lowe
Attorney, Agent, or Firm—Lawrence P. Kessler

[57] ABSTRACT

Fabrication of contact lenses whereby the yield of lenses removed from plastic casting molds is significantly increased. In fabricating contact lenses where a lens is initially formed in a plastic casting mold, the mold is compressed to a degree sufficient to initiate permanent deformation of the mold material, in progressive steps, incrementally decreasing in diameter from a starting diameter substantially larger than the diameter of the molded lens, until the lens self-detaches from the mold.

9 Claims, 2 Drawing Sheets

METHOD AND APPARATUS FOR REMOVING A CONTACT LENS FROM A PLASTIC MOLD

BACKGROUND OF THE INVENTION

This invention relates generally to contact lenses and more particularly to the fabrication of contact lenses.

Defects in human vision have for years been corrected by placing lenses, commonly referred to as glasses, of a prscribed design in front of the eye. Recently, as an alternative to glasses, contact lenses were developed. Contact lenses are thin lenses, typically made of a plastic material, fitted over the cornea to correct vision defects. A process for fabricating contact lenses involves filling a plastic casting mold with contact lens material in liquid monomer form. The liquid is then polymerized into a solid. The casting mold is precision manufactured such that the contact lens formed in the mold is of a prescribed edge dimension and the concave surface is of a prescribed finished optical design and quality. Once the convex surface of the lens is cut and polished to the prescribed optical quality, the lens can beremoved from the casting mold and is in a completely finished state.

while the above process has enabled contact lenses to be produced in mass quantities with high optical quality, the effective yield (i.e., the number of good lenses per total number of molded lenses) is low. This low yield is primarily due to the fact that removal of a lens from the plastic casting mold has been difficult. Such removal involves either floating the lens off of the casting mold in a liquid bath or deforming the casting mold such as by squeezing the mold with pliers for example. The liquid bath is an inefficient process only cost justified for large batches of lenses. Moreover, it is only effective for lenses made with liquid permiable material. On the other hand, deforming of the casting mold is a manual process, usable on only one mold at a time, requiring a high degree of skill to prevent braking of the lens as the mold is deformed.

SUMMARY OF THE INVENTION

This invention is directed to fabrication of contact lenses whereby the yield of lenses removed from plastic casting molds is significantly increased. According to a preferred embodiment of this invention. in fabricating contact lenses where a lens is initially formed in a plastic casting mold. the mold is compressed to a degree sufficient to initiate permanent deformation of the mold material. in progressive steps. incrementally decreasing in diameter from a starting diameter substantially larger than the diameter of the molded lens. until the lens self-detaches from the mold. The compression process may be carried out in a fluidbath for the purpose of dampening the compressive action. Further, the lens and casting mold may be preheated to facilitate the initiation of deformation, and the release of the lens from the mold.

The invention, and its objects and advantages. will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
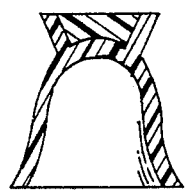
FIG. 1 is a view, in cross-section, of a plastic contact lens casting mold filled with lens material.
Figure 2:
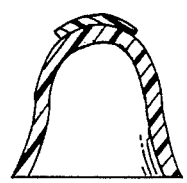
FIG. 2 is a view, in cross-section, of the casting mold with the contact lens cup cut away and the convex surface of the lens in its finished state.

Referring now to the accompanying drawings, FIG. 1 shows a plastic casting mold, designated generally by the numeral 10, in which a contact lens is formed. The mold 10, fabricated from nylon for example, includes a body portion 12 having an integrally formed cup 14 adapted to contain lens material. The base 16 of the cup is finished so as to have a surface finish to yield a complimentary surface finish of a predetermined optical quality, for example according to a particular lens prescription. Moreover the diameter of the cup 14 at its base is selected to be substantially equal to the desired diameter of the lens to be formed (e.g., 6-13 mm).

during fabrication of a contact lens, the cup 14 of the casting mold 10 is filled with a monomer of the material 18 from which the lens is to be formed. The material 18 is polymerized such as by irradiation with light of the particular wave lengths to induce such polymerization. Thereafter the cup 14 is cut off and the lens material 18 is polished to the desired optical quality. This results in a contact lens 20 finished on its convex surface 20a (see FIG. 2). Since the concave surface of the lens is formed to the desired optical quality finish during the molding process, lens fabrication is completed just by removing the lens from the body portion 12 of the casting mold 10.

Figure 3:
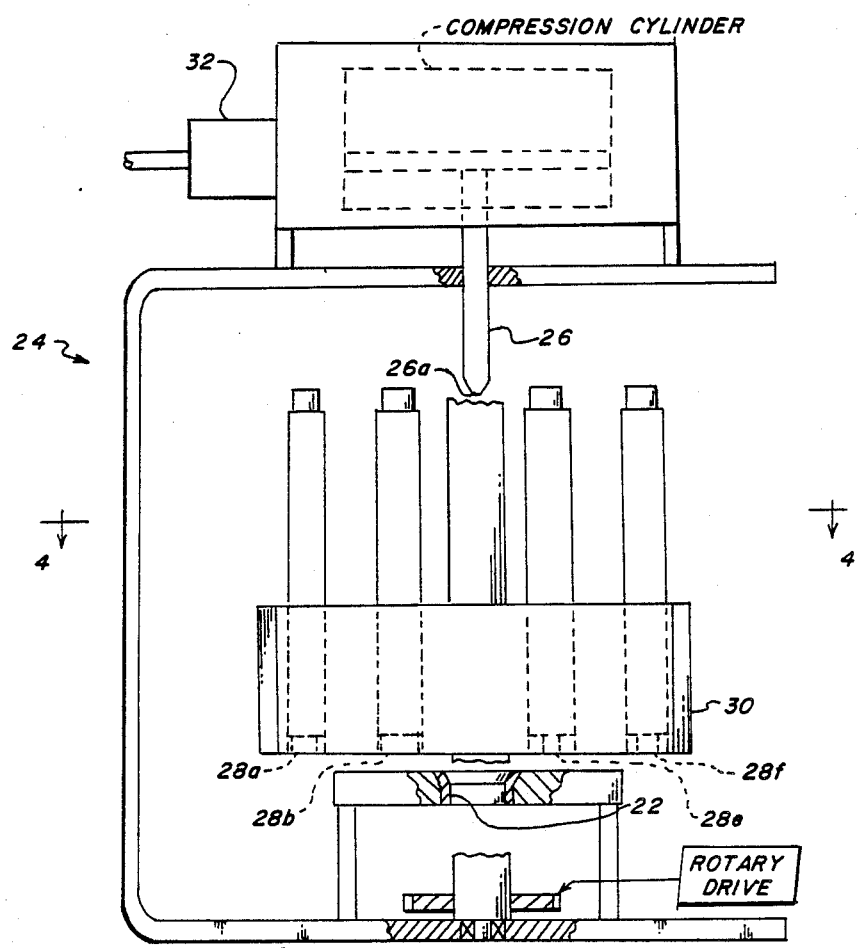
FIG. 3 is a side elevational view of an apparatus for removing the contact lens from the plastic casting mold according to this invention.

Removal of the contact lenses from respective casting molds successfully without damage to the lenses is accomplished according to this invention as follows. The body portion 12 of the casting mold, with the attached contact lens is positioned in a die 22 of a compression apparatus 24 (see FIG. 3). The apparatus 24 may be of the pneumatic or hydraulic cylinder type. Of course other apparatus developing compressive force, such as spring or lever based mechanisms, are suitable for use with this invention. The die 22 holds the body portion 12 such that it is substantially coaxially located with respect to the longitudinal axis of the piston rod 26 of the compression cylinder of the apparatus 24. A series of plungers 28a-28f, preferably made of brass, are mounted on a turret assembly 30. The turret assembly 30 is rotatable (either manually or by an automatically indexing mechanical mechanism) about an axis 30a to selectively locate a particular plunger between the end 26a of the piston rod 26 and the die 22. On activation of the compression cylinder by a control mechanism 32, the selected plunger is forced into engagement with the casting mold body portion 12 on the opposite side from the attached contact lens 20.

Figure 5:
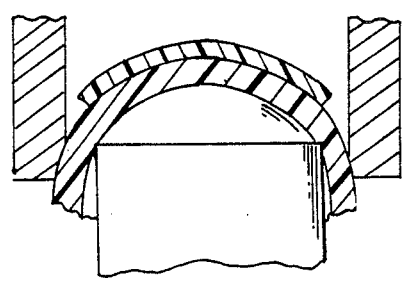
FIGS. 5 through 8 are views, in cross-section, taken at progressive stages during the operation of the apparatus of FIG. 3.
Figure 6:
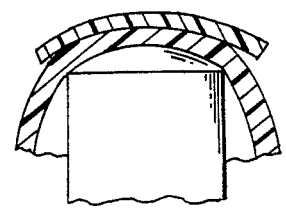
Figure 7:
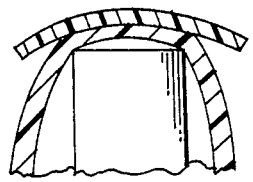
Figure 8:
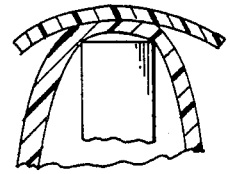
Figure 4:
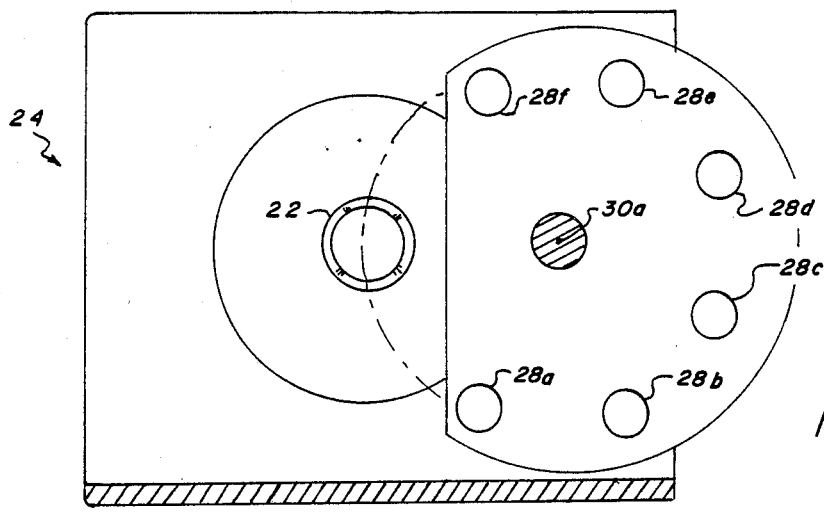
FIG. 4 is a top plan view of the apparatus of FIG. 3 for removing the contact lens from the plastic casting mold.

The control mechanism 32, which may include a programmable microprocessor for example, controls the amount of force, and the time duration and speed of its application by the compression cylinder through the plunger on the body portion of the casting mold in the die. The parameters of force application are selected, dependent in part on mold and lens composition and configuration so as to be sufficient to cause the beginning of plastic flow of the body portion material for permanent deformation of the body portion 12 of the casting mold (see FIG. 5). The permanent deformation of the body portion 12 is progressively continued, in descrete steps, utilizing successive plungers 28b–28f rotated into position by the turret 30. The plungers are arranged such that their respective diameters are of incrementally decreasing size so that, as can be seen in FIGS. 6–8, the lens 20 progressively detaches from the body portion 12 on each successive deformation until the lens finally self-detaches from the body portion.

As an illustrative example, the apparatus 24 may include an air cylinder of a diameter of approximately 10 cm utilizing air at a pressure of between 5–80 psi. Depending upon the material of the casting mold, the resultant force to be applied to the body portion 12 of the casting mold is in the range of between approximately 100–1400 pounds for a time of approximately between 2–10 sec. With a contact lens diameter of approximately between 4–16 mm, the diameter of the plunger 28 starts at approximately 1.2 cm and decreases in 0.15 cm increments down to 0.35 cm. Of course other arrangements for the apparatus 24 for carrying out the progressive permanent deformation are suitable for use with this invention. For example, the plungers may be successively manually located in position on the end of the piston rod of a compression cylinder to be engaged sequentially with the casting mold. Alternatively, the plungers may be in an in-line arrangement to be moved in a stepped manner for sequential activation, and progressive compressive application, on a single stroke of the compression cylinder.

The above process can be carried out in a fluid bath if so desired. This has the advantage of dampening the compressive action to further prevent damage to the contact lens 20 as it separates from the body portion 12 of the casting mold 10. It has also been found that preheating the body portion prior to subjecting it to the progressive compressive steps also facilitates lens removal. While the reasons for this are not yet completely understood, it is felt that such preheating encourages the onset of plastic flow necessary for the start of permanent deformation of the casting mold body portion. As an illustrative example, baking of the casting mold for ½ hour at 230° has resulted in an increase in the yield of contact lenses successfully removed by the process according to this invention.

The invention has been described in detail with particular reference to a preferred embodiment thereof, but it will be understood that variations and modifications can be effected within the spirit and scope of the invention.

I claim:

1. In fabricating a contact lens utilizing a plastic casting mold, a method of removing a molded contact lens from the plastic casting mold, said method comprising the steps of:
    applying a compressive force to the plastic casting mold at a location, on the opposite side of the casting mold from such lens, for a time sufficient to begin permanent deformation of the material of said casting mold; and
    similarly progressively permanently deforming said casting mold material in successively smaller diameter increments until the contact lens self-detaches from said casting mold.

2. The invention of claim 1 wherein said steps are carried out in a fluid bath.

3. The invention of claim 1 wherein, prior to said compressive force applying step, said casting mold is preheated.

4. The invention of claim 1 wherein the diameter of the area to which the compressive force is applied is substantially larger than the diameter of the contact lens.

5. The invention of claim 1 wherein the compressive force is in the range of approximately 100–1400 pounds.

6. The invention of claim 5 wherein the compressive force is applied for a time in the range of 5-sec.

7. Apparatus for removing a molded contact lens from a plastic casting mold used to form such contact lens, said apparatus comprising:
    means for supporting a plastic casting mold having its molded contact lens in association therewith;
    means for applying a compressive force to a plastic casting mold supported in said support means; and
    means for controlling said force applying means to effect initiation of permanent deformation of said casting mold in successive steps of incrementally reduced diameter until said contact lens self-detaches from said casting mold.

8. The invention of claim 7 wherein said force applying means includes a compression cylinder, and a series of plungers of differing diameters adapted to be operatively associated with said compression cylinder.

9. The invention of claim 8 wherein said series of plungers are mounted in a turret assembly, said turret assembly being rotatable about an axis to bring a preselected one of said series of plungers into operative association with said compression cylinder.

* * * * *